(12) United States Patent
Ouderkirk

(10) Patent No.: US 10,598,933 B2
(45) Date of Patent: Mar. 24, 2020

(54) SEE-THROUGH HEAD MOUNTED DISPLAY WITH LIQUID CRYSTAL MODULE FOR ADJUSTING BRIGHTNESS RATION OF COMBINED IMAGES

(71) Applicant: 3M INNOVATIVE PROPERTIES COMPANY, St. Paul, MN (US)

(72) Inventor: Andrew J. Ouderkirk, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/031,855

(22) PCT Filed: Nov. 5, 2014

(86) PCT No.: PCT/US2014/064014
§ 371 (c)(1),
(2) Date: Apr. 25, 2016

(87) PCT Pub. No.: WO2015/077019
PCT Pub. Date: May 28, 2015

(65) Prior Publication Data
US 2016/0266389 A1    Sep. 15, 2016

Related U.S. Application Data

(60) Provisional application No. 61/906,128, filed on Nov. 19, 2013.

(51) Int. Cl.
*G02B 27/01* (2006.01)
*G02B 5/30* (2006.01)
(Continued)

(52) U.S. Cl.
CPC .......... *G02B 27/0172* (2013.01); *G02B 5/30* (2013.01); *G02F 1/133528* (2013.01);
(Continued)

(58) Field of Classification Search
CPC .................................................. G02B 27/0172
See application file for complete search history.

(56) References Cited

U.S. PATENT DOCUMENTS 5,124,821 A    6/1992   Antier et al.
5,526,184 A    6/1996   Tokuhashi et al.
(Continued)

FOREIGN PATENT DOCUMENTS

CN      101320131       12/2008
CN      202204988 U      4/2012
(Continued)

OTHER PUBLICATIONS

PCT International Search Report from PCT/US2014/064014 dated Jan. 20, 2015, 4 pages.

*Primary Examiner* — Edmond C Lau
(74) *Attorney, Agent, or Firm* — Robert S. Moshrefzadeh

(57) ABSTRACT

An optical assembly including first (340) and second (312) polarizers and a liquid crystal module (314) disposed therebetween, with the first and second polarizers making an oblique angle of at least 5 degrees therebetween is disclosed. Optical devices like head mounted displays (300) including the optical assembly are also disclosed.

10 Claims, 2 Drawing Sheets

(51) Int. Cl.
*G02F 1/1335* (2006.01)
*G02B 27/10* (2006.01)

(52) U.S. Cl.
CPC ...... *G02F 1/133536* (2013.01); *G02B 27/108* (2013.01); *G02B 2027/0118* (2013.01); *G02F 2001/133531* (2013.01)

(56) References Cited

U.S. PATENT DOCUMENTS

| | | |
|---|---|---|
| 5,686,979 A | 11/1997 | Weber et al. |
| 5,696,521 A | 12/1997 | Robinson et al. |
| 5,838,490 A | 11/1998 | Fritz |
| 5,886,822 A * | 3/1999 | Spitzer ............... G02B 27/0172 359/630 |
| 6,147,807 A | 11/2000 | Droessler et al. |
| 6,424,448 B1 | 7/2002 | Levy |
| 7,791,804 B2 | 9/2010 | Moliton |
| 9,223,138 B2 | 12/2015 | Bohn |
| 2001/0000677 A1* | 5/2001 | Takagi ............... G02B 27/0101 349/25 |
| 2005/0117095 A1* | 6/2005 | Ma ................... G02F 1/133553 349/113 |
| 2007/0132998 A1* | 6/2007 | Tang ................ G01N 21/6458 356/417 |
| 2012/0212400 A1 | 8/2012 | Border et al. |
| 2012/0242698 A1* | 9/2012 | Haddick ............ G02B 27/0093 345/633 |
| 2013/0108229 A1 | 5/2013 | Starner et al. |
| 2014/0293390 A1 | 10/2014 | Hayashibe et al. |

FOREIGN PATENT DOCUMENTS

| | | |
|---|---|---|
| JP | 04221920 A * | 8/1992 |
| JP | H04-221920 | 8/1992 |

* cited by examiner

SEE-THROUGH HEAD MOUNTED DISPLAY WITH LIQUID CRYSTAL MODULE FOR ADJUSTING BRIGHTNESS RATION OF COMBINED IMAGES

BACKGROUND

Reflective and absorbing polarizers may substantially transmit light having one polarization state while substantially reflecting or absorbing, respectively, light having a second orthogonal polarization state. Liquid crystal modules may be used to rotate or modulate the polarization state of light. Liquid crystal modules may be electrically driven and may include individually addressable pixel elements.

SUMMARY

In one aspect, the present disclosure relates to an optical assembly. In particular, the optical assembly includes a liquid crystal module disposed between first and second polarizers, the first and second polarizers making an oblique angle of at least 5 degrees therebetween. In some embodiments, the optical assembly is configured so that light enters the optical assembly through the first polarizer and exits the optical assembly through the second polarizer after going through the liquid crystal module, where the liquid crystal module is configured to vary an intensity of light exiting the optical assembly in response to an electronic signal. In some embodiments, the light that enters the optical assembly through the first polarizer is from a real world scene. The first polarizer and the liquid crystal module may be parallel. In some embodiments, the optical assembly includes an electronic image forming device making an oblique angle with the second polarizer that is at least 5 degrees. The optical assembly may be configured so that light from the electronic image forming device exits the optical assembly after being reflected by the second polarizer. In some embodiments, the first polarizer is an absorbing polarizer. In some embodiments, the second polarizer is a reflective polarizer. In some embodiments, one or both of the first polarizer and the second polarizer has a cross polarizer extinction greater than 0. In some embodiments, one or both of the first polarizer and the second polarizer is at least partially curved. The liquid crystal module may be a single pixel liquid crystal module. The liquid crystal module may include individually addressable pixels.

In another aspect, the present disclosure relates to a viewing device. The viewing device receives a first light having a first brightness $B_1$ from a real world scene through a first input side of the viewing device and a second light having a second brightness $B_1$ from an electronic image forming device through a different second input side of the viewing device, the viewing device combining the first and second lights for viewing by a viewer, the viewing device being configured to vary $B_1/B_2$ as viewed by a viewer in response to an electronic signal. In some embodiments, the first input side is perpendicular to the second input side. In some embodiments, the viewing device includes a first polarizer and a liquid crystal module disposed at the first input side, a second polarizer making an oblique angle of at least 5 degrees with the first polarizer, the liquid crystal module being disposed between the first and second polarizers, and an electronic image forming device disposed at the second input side, such that the first light exits the viewing device through the second polarizer after passing first through the first polarizer and then through the liquid crystal module, and the second light exits the viewing device after being reflected by the second polarizer.

In yet another aspect, the present disclosure relates to a viewing device including a polarization modulator for receiving a first image light and transmitting the received light as a first polarized image light having a modulated polarization state. The polarization modulator is configured to vary the modulated polarization state between a first polarization state and an orthogonal second polarization state, inclusive. The viewing device also includes a first polarizer for receiving the first polarized image light incident on a first major surface of the first polarizer along a first incident direction and for receiving a second image light from an electronic image forming device and incident on an opposing second major surface of the first polarizer along a different second incident direction. The first polarizer substantially transmits polarizer light having the first polarization state and substantially reflects polarized light having the second polarization state, the first polarizer being configured to transmit the first polarized image light and to reflect the second image light for viewing by a viewer. In some embodiments, the polarization modulator includes a second polarizer substantially transmitting polarized light having the first polarization state and substantially rejecting polarized light having the second polarization state, the first polarizer being configured to receive the first image light and transmit the received light as the first polarized image light having the first polarization state. The polarization modulator also includes a liquid crystal module configured to receive the first polarized image light and vary the polarization state of the received light and transmit the received light as the first polarized image light having the modulated polarization state, the modulated polarization state being between the first and second polarization states, inclusive. In some embodiments, the liquid crystal module is configured to vary the polarization state of a received light in response to one or more discrete signals. The liquid crystal module may be a single pixel liquid crystal module. The liquid crystal module may include individually addressable pixels. In some embodiments, the second polarizer substantially rejects polarized light having the second polarization state by substantially reflecting the polarized light. In some embodiments, the second polarizer substantially rejects polarized light having the second polarized state by substantially absorbing the polarized light. The first incident direction may be substantially perpendicular to the second incident direction. The first polarizer may make an oblique angle with the polarization modulator that is at least 5 degrees. In some embodiments, the first image light is substantially unpolarized. In some embodiments, the second image light is substantially unpolarized. In some embodiments, the first image light is from a real world scene.

In another aspect, the present disclosure relates to a viewing device, where the viewing device includes a first polarizer substantially transmitting polarized light having a first polarization state and substantially rejecting polarized light having a second polarization state perpendicular to the first polarization state, the first polarizer being configured to receive a first image light and transmit the received light as a first polarized image light having the first polarization state. The viewing device also includes a first polarizer substantially transmitting polarized light having a first polarization state and substantially rejecting polarized light having a second polarization state perpendicular to the first polarization state, the first polarizer being configured to receive a first image light and transmit the received light as a first polarized image light having the first polarization state. Further, the viewing device includes a second polarizer substantially transmitting polarized light having the first polarization state and substantially reflecting polarized light having the second polarization state, the second polarizer being configured to receive and transmit the first polarized image having a modulated polarization state and to receive and reflect a second image light from an electronic image forming device, the transmitted first polarized image and the reflected second image light being combined for viewing by a viewer. In some embodiments, the viewing device is included in a head mounted display or eyeglasses. The head mounted display may include a frame having a window disposed in an opening in the frame, and the liquid crystal module may cover only a portion of the window or it may cover substantially the entire window.

DETAILED DESCRIPTION

Figure 1:
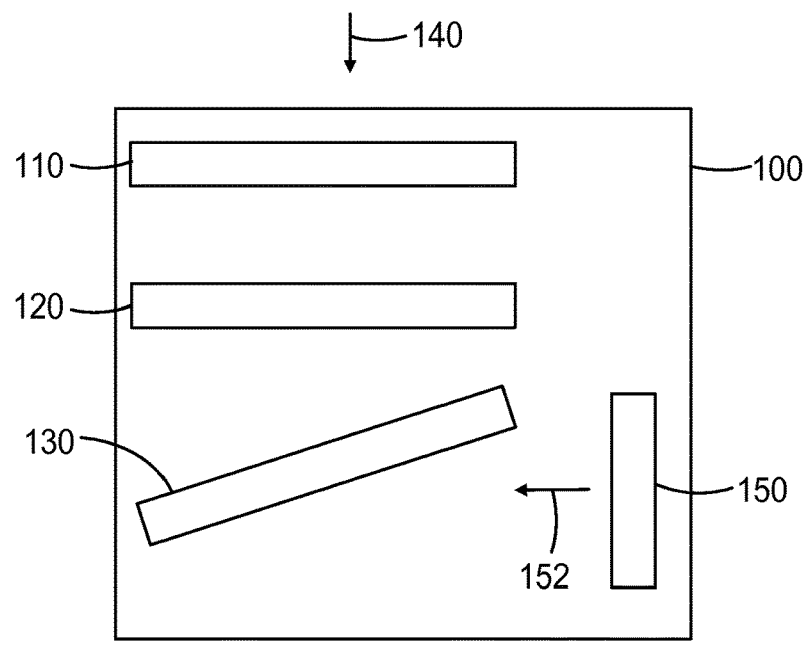
FIG. 1 is a schematic diagram of an optical assembly.

FIG. 1 is a schematic diagram illustrating a first embodiment of an optical assembly. Optical assembly 100 includes first polarizer 110, liquid crystal module 120, second polarizer 130, and electronic image forming device 150 that may generate image light 152. Light 140 is incident on optical assembly 100.

In some embodiments, first polarizer 110 and second polarizer 130 may be configured such that they form an oblique angle of at least 5 degrees. In other words, first polarizer 110 may generally lie in a first plane and second polarizer 130 may generally lie in a second plane, and those planes may make an oblique angle of at least 5 degrees. In some embodiments the angle formed between the first and second polarizers may be greater, such as 10, 15, 25, 30, or even 45 degrees or more. In some embodiments, first polarizer 110 may be parallel to liquid crystal module 120. The illustrated configuration of optical assembly 100 is intended only to suggest the relative positioning of first polarizer 110, second polarizer 130, and liquid crystal module 120, and not to describe spacing or whether one or more of the elements is adhered or laminated to another. For example, second polarizer 130 may in some embodiments be reversed such that the left side of second polarizer 130 as viewed from a top plan view is closer to liquid crystal module 120. In other words, in some embodiments, the angle formed by the first and second polarizers may be −5, −10, −15, −25, −30, or even −45 degrees. In some embodiments, only the absolute value of the angle may be important. In some embodiments there may be one or more air gaps within optical assembly 100, or the optical assembly 100 may be immersed in an optical medium or resin, to protect and fix the relative positioning of the components.

First polarizer 110 and second polarizer 130 may be any type of polarizer, including absorbing, reflecting or reflective, and hybrid (absorbing/reflecting) polarizers. In some embodiments, first polarizer 110 may be an absorbing polarizer and second polarizer 130 may be a reflecting polarizer. Absorbing polarizers may include any suitable material, including polarizing absorbing dyes or the like. Reflecting polarizers may include wire grid polarizers and multilayer optical film reflective polarizers, and in particular, birefringent multilayer optical film reflective polarizers. In some embodiments, the reflective polarizers may be wideband reflective polarizers, preferentially reflecting light of one polarization state across most or all of the visible spectrum. In some embodiments, wideband reflective polarizers may reflect light in adjacent spectra, such as infrared or ultraviolet light. In some embodiments, first polarizer 110, second polarizer 130, or both may be a weak polarizer. In other words, in some embodiments, the calculated cross polarizer extinction of two of the first polarizers or two of the second polarizers is in some cases greater than at least 8%, or in some cases greater than at least 10%.

In some embodiments, one or more of first polarizer 110 and second polarizer 130 is curved for at least a portion of the length of the polarizer. In such cases the angle between the first and second polarizers may be defined by the minimum angle between the polarizers (or the minimum angle between tangential planes of the polarizers). In some embodiments, first polarizer 110 and second polarizer 130 may be the same size or may be different sizes.

The liquid crystal module may be any suitable module. In some embodiments, the liquid crystal module is a polarization modulating liquid crystal module. The polarization modulation liquid crystal module may be a twisted nematic or super-twisted nematic type liquid crystal module. The specific configuration of liquid crystal module 120 may be coordinated with the orientation of the block axes of first polarizer 110 and second polarizer 130. In some embodiments, liquid crystal module 120 may include a single pixel. In other embodiments, liquid crystal module 120 may include a plurality of pixels, and in some cases an array of individually addressable pixels. In this case, appropriate standard electrical components, including electrodes and one or more microprocessors may be included. These are not shown in FIG. 1 for the sake of simplicity.

Electronic image forming device 150 may be any suitable component, including suitable optics and light generation means. For example, electronic image forming device 150 may include one or more spatial light modulators (including digital micromirror devices or liquid crystal on silicon configurations), light emitting diodes (LEDs) (either single-color or multiple colors), organic LEDs (OLEDs) or other suitable backlight components, polarizers, collimators, and lenses. Electronic image forming device 150 may be powered by any suitable mechanism, including by a battery. Electronic image forming device 150 may be powered, driven, and/or configured and controlled by any suitable component or combination of components, including microprocessors, microcontrollers, or other devices or microdevices. Electronic image forming device 150 generates image light 152, which in some embodiments includes image information. In some embodiments, image light 152 may be at least partially polarized by electronic image forming device 150.

Image light 152 may be incident on second polarizer 130. In some embodiments, second polarizer 130 preferentially reflects one polarization of image light 152. In this sense second polarizer 130 may function as a polarizing beam splitter. Image light 152 may be configured to be at least partially polarized to minimize transmitted light, which in some applications may increase efficiency, reduce distracting light leakage, or minimize stray reflection of light off other components.

Optical assembly 100 may be incorporated into a larger optical system or display. In some embodiments, optical assembly 100 may be incorporated into a wearable display device or a head mounted display. In many head mounted displays, a polarizing beam splitter located in front of the eye at least partially transmits visible light of one or both orthogonal polarization states. Thus, a viewer may observe real world scenes through the head mounted display. A real world scene is light or images available to a viewer without electronically aided vision. In some embodiments where a polarizing beam splitter located in front of the eye at least partially reflects a polarization state of light, the head mounted display may have the added benefit of reducing glare from reflected real world scene light.

In such a configuration and in similar near-to-eye setups, light 140 may be light from a real world scene. Light 140 may enter optical assembly 100 through first polarizer 110 and may exit optical assembly 100 after either being reflected or transmitted by second polarizer 130. Likewise, image light 152 may exit optical assembly 100 after being either reflected or transmitted by second polarizer 130. In some embodiments image light 152 and light 140 may exit optical assembly 100 together as to appear to be superimposed or combined within a viewer's field of vision. The ratio of image light 152 to light 140 from a real world scene may be modulated through liquid crystal module 120.

Figure 2:
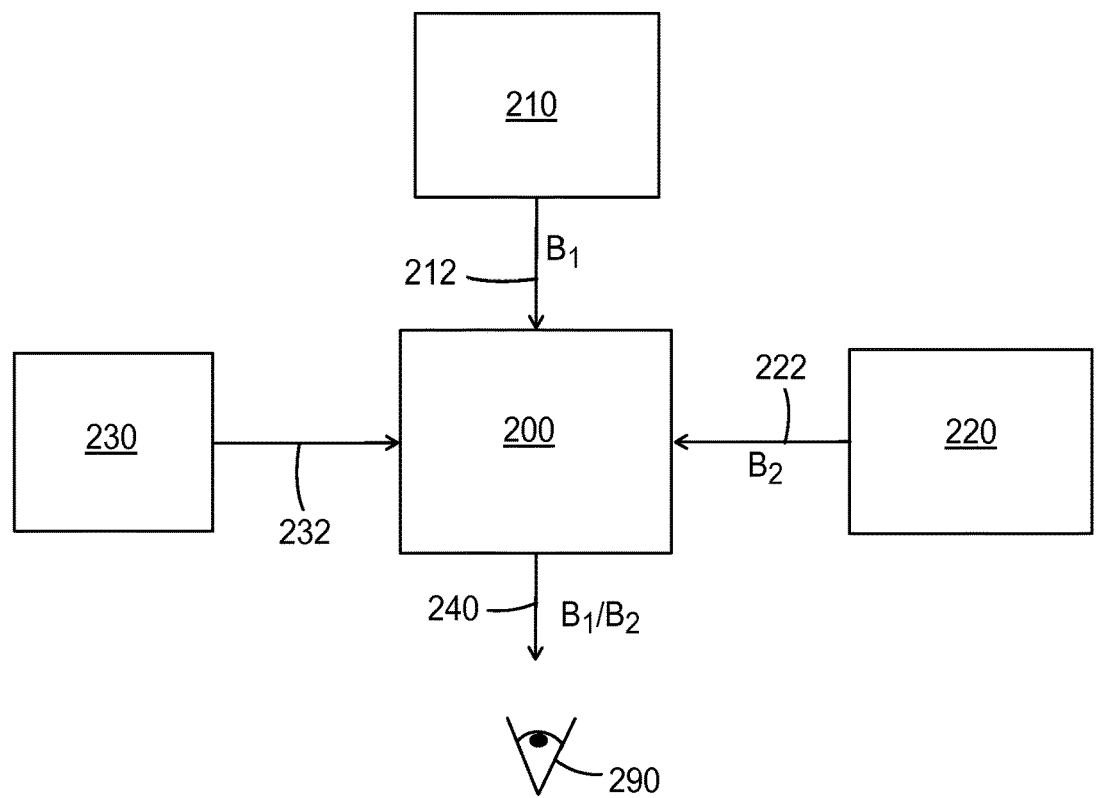
FIG. 2 is a diagram of a viewing device including an optical assembly.

FIG. 2 is a diagram illustrating a viewing device including an optical assembly. Optical assembly 200 receives first light 212 from real world scene 210, second light 222 from electronic image forming device 220, and electronic signal 232 from microprocessor 230. Optical assembly 200 outputs output light 240 which may be observed by a viewer 290. The diagrammatic form is intended only to convey the general inputs and outputs of optical assembly 200 and is not meant to provide information about the physical configuration or orientation of the viewing device.

First light 212 from real world scene 210 enters through a first input side of optical assembly 200. First light 212 has a brightness $B_1$ and depends on a variety of factors. In many cases the brightness of first light 212 is dependent on the ambient environment. In some embodiments related to head mounted displays, brightness $B_1$ may only be altered externally (e.g., dimming a room's lights or turning to face a different real world scene).

Second light 222 from electronic image forming device 220 in some embodiments may correspond with electronic image forming device 150 in FIG. 1. Second light 222, having brightness $B_2$, is received through a second input side of optical assembly 200. In contrast to first light 212, the brightness of second light 222, being generated by electronic image forming device 220, may be adjustable within a certain range of the device's capabilities. In some embodiments, the first input side and the second input side are perpendicular.

In previous comparable devices, first light 212 and second light 222 may be combined or mixed into output light 240, to be observed by a viewer 290. However, because in some cases second light 222 but not first light 212 may be adjustable, it can be difficult to precisely control the combination of the two lights to keep it within a desired range. For example, if real world scene 210 includes the sun, the brightness $B_1$ of first light 212 will be extremely high, and in many cases much higher than any brightness $B_2$ of second light 222 electronic image forming device 220 is capable of generating. Thus, any combination of the two lights would be dominated by real world scene 210.

Optical assembly 200 is configured to adjust the ratio of brightness $B_1$ and brightness $B_2$ as viewed by viewer 290, from first light 212 and second light 222, respectively, in output light 240. In some embodiments, optical assembly 200 may modulate the viewed, apparent, or perceived brightness of first light 212. Optical assembly 200 may include a liquid crystal module and appropriately oriented polarizers to achieve a dimming effect. In some embodiments optical assembly 200 modulates first light 212 in response to electronic signal 232 from microprocessor 230.

In some embodiments electronic signal 232 may include information corresponding to individually addressable elements of optical assembly 200, such as pixels on a pixilated light modulator. Electronic signal 232 is generated by microprocessor 230, or it may be generated by any other suitable component. In some embodiments microprocessor 230 may generate electronic signal 232 in response to information from a sensor (not shown), such as the brightness of real world scene 210. In other examples, a sensor may be able to detect the location, relative to viewer 290 of a bright or dark spot in real world scene 210, and may be capable of modulating first light 212 through optical assembly 200 to bring its contribution to output light 240 within desired brightness ranges. In some cases optical assembly 200 may dim the brightness $B_1$ of a portion of real world scene 210, which may provide enhanced readability of content from electronic image forming device 220 when second light 222 is superimposed on first light 212 in output light 240. In some embodiments microprocessor 230 may generate electronic signal 232 in response to user input, such as a selection of one or more viewing modes. In other embodiments, microprocessor 230 may generate electronic signal 232 in response to input from a sensor, timer, or combination thereof. In the most general sense, output light 240 may adjust the ratio of brightness $B_1$ to brightness $B_2$ as viewed by a viewer through optical assembly 200 to a suitable value depending on the desired application, taking into account any appropriate stimulus or trigger. Optical assembly 200 may in some embodiments have a response time of less than 10 seconds, less than 1 second or less than 0.1 seconds. In some embodiments, optical assembly may have low power consumption.

Figure 3:
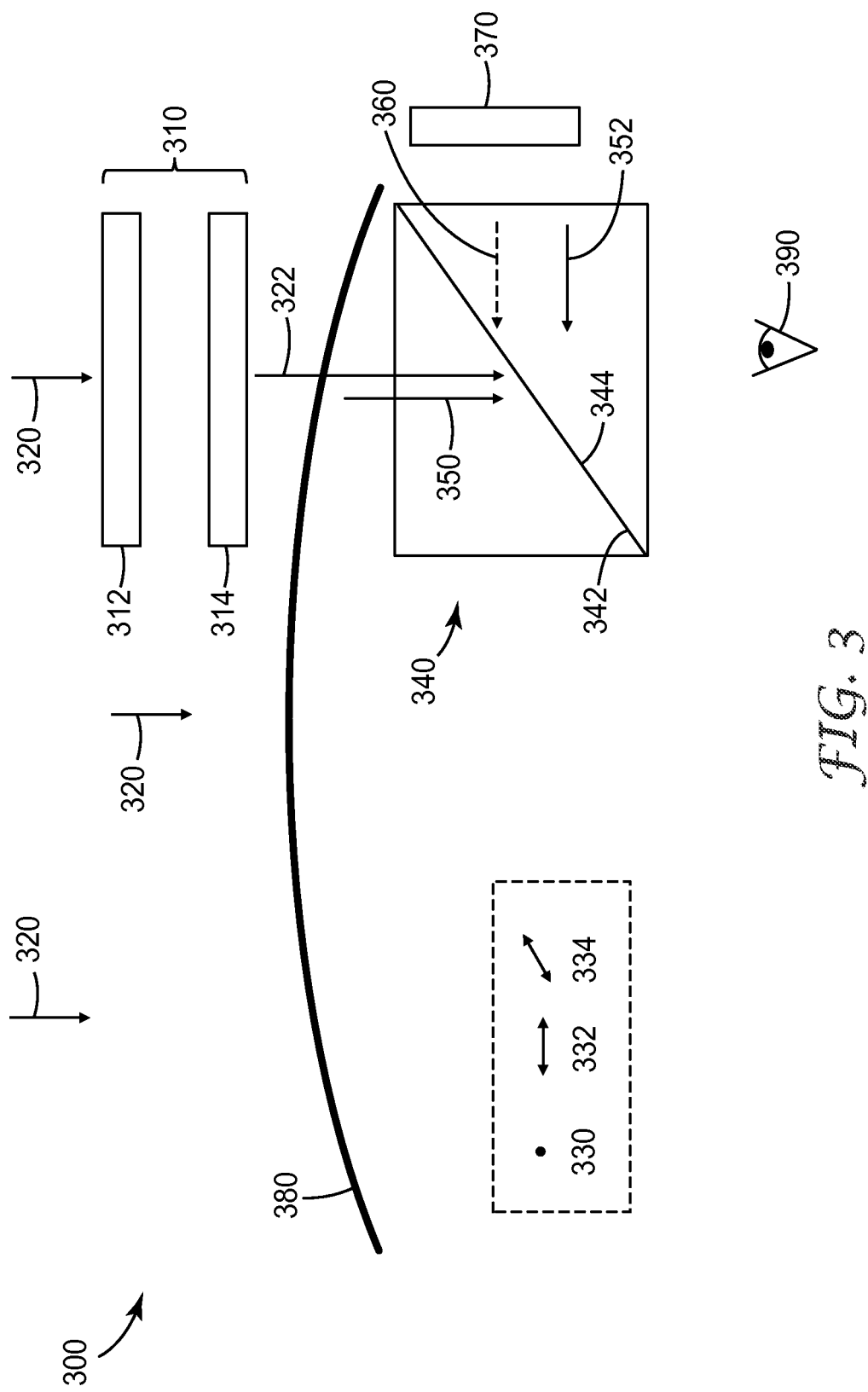
FIG. 3 is a schematic top plan view of a viewing device including an optical assembly.

FIG. 3 is a schematic top plan view of a viewing device including an optical assembly, in this case configured as a head mounted display. Viewing device 300 includes a polarization modulator 310, which includes second polarizer 312 and liquid crystal module 314, first polarizer 340 having first major surface 342 and second major surface 344, electronic image forming device 370, and frame 380.

To better understand the function of the exemplary viewing device, it may be helpful to trace both first image light 320, which in some embodiments may be from a real world scene and often includes substantially unpolarized light, and second image light 360, which is provided by electronic image forming device 370 and may or may not be polarized. Polarization states such as first polarization state 330, second (orthogonal) polarization state 332, and modulated polarization state 334 (being between first polarization state 330 and second polarization state 332, inclusive) are shown in the broken-lined box.

First image light 320 is received by polarization modulator 310 and is transmitted as first polarized image light 322. Polarization modulator 310 includes second polarizer 312 and liquid crystal module 314. Second polarizer may be any suitable type of polarizer as described elsewhere, including an absorbing polarizer. In general, second polarizer 312 is configured to receive first image light 320 and transmit first polarized image light 322. First polarized image light may have first polarization state 330. Note that the first and second orthogonal polarization states were arbitrarily selected for ease of illustration, and one skilled in the art will appreciate that any set of orthogonal polarization states may be used, depending on the configuration of the polarizing and polarization modulating components of viewing device 300.

Liquid crystal module 314 rotates or varies the now-polarized first image light 320, having first polarization state 330. Liquid crystal module may be controlled or driven by any suitable electronics, and in many cases may include individually addressable pixels. Depending on the liquid crystal structure, polarization may be preserved or rotated in the off state. Once electrically driven, liquid crystal module 314 may modulate the polarization state of first image light 320 to any polarization state between first polarization state 330 and orthogonal second polarization state 332, inclusive. This modulated polarization state is represented by modulated polarization state 334 for ease of illustration, though in practice modulated polarization state may be identical to either of first polarization state 330 or second polarization state 332.

First polarized image light 322 passes frame 380, which may be used to maintain position on a user's face or head. Frame 380 may resemble an eyeglasses frame. In some embodiments frame 380 is hollow or empty at the point first polarized image light 322 intersects the plane of frame 380; in some embodiments it may be a translucent, transparent, or optically clear portion of frame 380. In any of these cases the portion of frame 380 that allows first polarized image light 322 to pass may be described as a window. The window may be any suitable size and shape. In some embodiments the viewing device and the window are coextensive, such that light must travel through viewing device 300 in order to travel through the window. In other embodiments, the viewing device may cover less area than the window, allowing other portions of first image light 320 to reach viewer 390 without travelling through viewing device 300.

First polarizer 340 includes first major surface 342. First polarized image light 322 is incident on first major surface 342 of first polarizer 340 along a first incident direction 350. First polarizer may be immersed in a medium having an index of refraction greater than 1. In some embodiments, first polarizer 340 may be a reflective polarizer. First polarizer 340 may be configured and selected to take advantage of the dependence of transmission and reflection spectra on angle of incidence and index of refraction of the incident medium. In some embodiments, first polarizer 340 may be configured as a polarizing beam splitter. In some embodiments, an additional reflective surface may be provided adjacent to one or more ends of first polarizer 340, which may be in conjunction with or behind a quarter-wave plate. The combination of the quarter-wave plate and the reflective surface may rotate the polarization of light in cases where the light travels twice through the quarter-wave plate.

A portion of first polarized image light 322 may be reflected or absorbed and a portion may be transmitted through first polarizer 340. Transmitted light exits viewing device 300 and may be incident on viewer 390 for viewing. In some embodiments, first polarization state 330 is substantially reflected, while second polarization state 332 may be substantially transmitted. In other embodiments, second polarization state 332 is substantially reflected while first polarization state 330 may be substantially transmitted. Thus, depending on the state of liquid crystal module 314 and its modulation of first polarized image light 322, first polarized image light may be more or less transmitted by first polarizer, effectively modulating its brightness.

Second image light 352 is incident on second major surface 344 of first polarizer 340 along second incident direction 360. In some embodiments second incident direction 360 may be perpendicular to first incident direction 350. As with first polarized image light 322, some or all of second image light 352 may be reflected, absorbed, or transmitted by first polarizer 340. Second image light 352 that is reflected by first polarizer 340 also exits viewing device 300 and is incident on viewer 390 for viewing. Viewer 390 may observe reflected second image light 352 superimposed on light from the real world scene (as the transmitted portion of first polarized image light 322). In some embodiments viewer 390 may also observe a portion of first image light 320 that passes through the window in frame 380, but does not pass through viewing device 300.

In some applications, the configuration of viewing device 300 may provide enhanced privacy in certain situations. For example, in dim environments where liquid crystal module 314 is configured to modulate the polarization state of the ambient light, the same state of the liquid crystal module 320 may serve to block escaping second image light 352, particularly in situations where first polarizer 340 is combined with a reflective surface or film and a quarter-wave plate.

The following are items of the present invention:

Item 1 is an optical assembly comprising a liquid crystal module disposed between first and second polarizers, the first and second polarizers making an oblique angle of at least 5 degrees therebetween.

Item 2 is the optical assembly of item 1 being configured so that light enters the optical assembly through the first polarizer and exits the optical assembly through the second polarizer after going through the liquid crystal module, wherein the liquid crystal module is configured to vary an intensity of light exiting the optical assembly in response to an electronic signal.

Item 3 is the optical assembly of item 2, wherein the light that enters the optical assembly through the first polarizer is from a real world scene.

Item 4 is the optical assembly of item 1, wherein the first polarizer and the liquid crystal module are parallel.

Item 5 is the optical assembly of item 1 further comprising an electronic image forming device making an oblique angle with the second polarizer that is at least 5 degrees.

Item 6 is the optical assembly of item 5 being configured so that light from the electronic image forming device exits the optical assembly after being reflected by the second polarizer.

Item 7 is the optical assembly of item 1, wherein the first polarizer is an absorbing polarizer.

Item 8 is the optical assembly of item 1, wherein the second polarizer is a reflective polarizer.

Item 9 is the optical assembly of item 1, wherein one or both of the first polarizer and the second polarizer has a cross polarizer extinction greater than 0.

Item 10 is the optical assembly of item 1, wherein one or both of the first polarizer and the second polarizer is at least partially curved.

Item 11 is the viewing device of item 1, wherein the liquid crystal module is a single pixel liquid crystal module.

Item 12 is the viewing device of item 1, wherein the liquid crystal module comprises individually addressable pixels.

Item 13 is a viewing device receiving a first light having a first brightness $B_1$ from a real world scene through a first input side of the viewing device and a second light having a second brightness $B_2$ from an electronic image forming device through a different second input side of the viewing device, the viewing device combining the first and second lights for viewing by a viewer, the viewing device being configured to vary $B_1/B_2$ as viewed by a viewer in response to an electronic signal.

Item 14 is the viewing device of item 13, wherein the first input side is perpendicular to the second input side.

Item 15 is the viewing device of item 13 comprising:
a first polarizer and a liquid crystal module disposed at the first input side;
a second polarizer making an oblique angle of at least 5 degrees with the first polarizer, the liquid crystal module being disposed between the first and second polarizers; and
an electronic image forming device disposed at the second input side;
such that the first light exits the viewing device through the second polarizer after passing first through the first polarizer and then through the liquid crystal module, and the second light exits the viewing device after being reflected by the second polarizer.

Item 16 is a viewing device (300), comprising:
a polarization modulator (310) for receiving a first image light (320) and transmitting the received light as a first polarized image light (322) having a modulated polarization state (134), the polarization modulator being configured to vary the modulated polarization state between a first polarization state (330) and an orthogonal second polarization state (332), inclusive;
a first polarizer (340) for receiving the first polarized image light incident on a first major surface (342) of the first polarizer along a first incident direction (350) and for receiving a second image light (352) from an electronic image forming device (370) and incident on an opposing second major surface (344) of the first polarizer along a different second incident direction (360), the first polarizer substantially transmitting polarized light having the first polarization state and substantially reflecting polarized light having the second polarization state, the first polarizer being configured to transmit the first polarized image light and to reflect the second image light for viewing by a viewer (390).

Item 17 is the viewing device of item 16, wherein the polarization modulator comprises:
a second polarizer (312) substantially transmitting polarized light having the first polarization state and substantially rejecting polarized light having the second polarization state, the first polarizer being configured to receive the first image light and transmit the received light as the first polarized image light having the first polarization state; and
a liquid crystal module (314) configured to receive the first polarized image light and vary the polarization state of the received light and transmit the received light as the first polarized image light having the modulated polarization state (334), the modulated polarization state being between the first and second polarization states, inclusive.

Item 18 is the viewing device of item 17, wherein the liquid crystal module is configured to vary the polarization state of a received light in response to one or more discrete signals.

Item 19 is the viewing device of item 17, wherein the liquid crystal module is a single pixel liquid crystal module.

Item 20 is the viewing device of item 17, wherein the liquid crystal module comprises individually addressable pixels.

Item 21 is the viewing device of item 17, wherein the second polarizer substantially rejects polarized light having the second polarization state by substantially reflecting the polarized light.

Item 22 is the viewing device of item 17, wherein the second polarizer substantially rejects polarized light having the second polarization state by substantially absorbing the polarized light.

Item 23 is the viewing device of item 16, wherein the first incident direction is substantially perpendicular to the second incident direction.

Item 24 is the viewing device of item 16, wherein the first polarizer makes an oblique angle with the polarization modulator that is at least 5 degrees.

Item 25 is the viewing device of item 16, wherein the first image light is substantially unpolarized.

Item 26 is the viewing device of item 16, wherein the second image light is substantially unpolarized.

Item 27 is the viewing device of item 16, wherein the first image light is from a real world scene.

Item 28 is an eyeglasses comprising:
a window configured to be positioned in front of a user's eye; and
the viewing device of claim 16, such that when a user wears the eyeglasses, the user views a first portion of the first image light after the first portion passes through the window and the viewing device, and a second portion of the first image light after the second portion passes through the window, but not the viewing device.

Item 29 is a viewing device, comprising:
a first polarizer substantially transmitting polarized light having a first polarization state and substantially rejecting polarized light having a second polarization state perpendicular to the first polarization state, the first polarizer being configured to receive a first image light and transmit the received light as a first polarized image light having the first polarization state; and
a liquid crystal module configured to receive the first polarized image light and vary the polarization state of the received light and transmit the received light as the first polarized image light having a modulated polarization state, the modulated polarization state being between the first and second polarization states, inclusive; and
a second polarizer substantially transmitting polarized light having the first polarization state and substantially reflecting polarized light having the second polarization state, the second polarizer being configured to receive and transmit the first polarized image having a modulated polarization state and to receive and reflect a second image light from an electronic image forming device, the transmitted first polarized image and the reflected second image light being combined for viewing by a viewer.

Item 30 is a head mountable display comprising:
a frame configured to be mounted on a user's head, the frame defining an opening configured to be positioned in front of the user's eye;
a window disposed within the opening and supported by the frame; and
the viewing device of claim 29, wherein the window is disposed between the liquid crystal module and the second polarizer.

Item 31 is the head mounted display of item 30, wherein the liquid crystal module covers only a portion of the window.

Item 32 is the head mounted display of item 30, wherein the liquid crystal module covers substantially the entire window.

Descriptions for elements in figures should be understood to apply equally to corresponding elements in other figures, unless indicated otherwise. The present invention should not be considered limited to the particular embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

What is claimed is:

1. An optical assembly comprising a liquid crystal module disposed between first and second polarizers, the first and second polarizers making an oblique angle of at least 5 degrees therebetween, wherein at least one of the first and second polarizers is a weak polarizer such that the at least one of the first and second polarizers has a cross polarizer extinction greater than at least 8%.

2. The optical assembly of claim 1 being configured so that light enters the optical assembly through the first polarizer and exits the optical assembly through the second polarizer after going through the liquid crystal module, wherein the liquid crystal module is configured to vary an intensity of light exiting the optical assembly in response to an electronic signal.

3. The optical assembly of claim 2, wherein the light that enters the optical assembly through the first polarizer is from a real world scene.

4. The optical assembly of claim 1, wherein the first polarizer and the liquid crystal module are parallel.

5. The optical assembly of claim 1 further comprising an electronic image forming device making an oblique angle with the second polarizer that is at least 5 degrees.

6. The optical assembly of claim 5 being configured so that light from the electronic image forming device exits the optical assembly after being reflected by the second polarizer.

7. The optical assembly of claim 1, wherein the first polarizer is an absorbing polarizer.

8. The optical assembly of claim 1, wherein the second polarizer is a reflective polarizer.

9. The viewing device of claim 1, wherein the liquid crystal module is a single pixel liquid crystal module.

10. The viewing device of claim 1, wherein the liquid crystal module comprises individually addressable pixels.

* * * * *